(12) United States Patent
Kokko

(10) Patent No.: US 7,627,533 B2
(45) Date of Patent: Dec. 1, 2009

(54) METHOD AND ARRANGEMENT FOR CONCEALING TRUE IDENTITY OF USER IN COMMUNICATIONS SYSTEM

(75) Inventor: Marko H. Kokko, Oulu (FI)

(73) Assignee: Nokia Corporation, Espoo (FI)

( * ) Notice: Subject to any disclaimer, the term of this patent is extended or adjusted under 35 U.S.C. 154(b) by 265 days.

(21) Appl. No.: 10/681,393

(22) Filed: Oct. 8, 2003

(65) Prior Publication Data
US 2004/0111376 A1 Jun. 10, 2004

(30) Foreign Application Priority Data
Oct. 9, 2002 (EP) .................................. 02102425

(51) Int. Cl.
*G06Q 99/00* (2006.01)
(52) U.S. Cl. ................... 705/74; 705/64; 726/2; 713/150
(58) Field of Classification Search ............. 705/50–79; 709/225–229; 726/2; 713/150
See application file for complete search history.

(56) References Cited

U.S. PATENT DOCUMENTS

| 6,968,385 | B1 * | 11/2005 | Gilbert ........................ 709/229 |
| 7,020,685 | B1 * | 3/2006 | Chen et al. .................. 709/204 |
| 7,069,249 | B2 * | 6/2006 | Stolfo et al. .................. 705/74 |
| 2001/0029496 | A1 * | 10/2001 | Otto et al. ..................... 705/74 |
| 2001/0037316 | A1 * | 11/2001 | Shiloh .......................... 705/74 |
| 2003/0009523 | A1 * | 1/2003 | Lindskog et al. ............ 709/205 |
| 2003/0069857 | A1 * | 4/2003 | Junda ........................... 705/74 |
| 2005/0132065 | A1 * | 6/2005 | Zhou ........................... 709/227 |
| 2005/0232191 | A1 * | 10/2005 | Wills ........................... 370/328 |
| 2006/0004659 | A1 * | 1/2006 | Hutchison et al. ............ 705/40 |
| 2008/0263639 | A1 * | 10/2008 | Maria ............................ 726/4 |

FOREIGN PATENT DOCUMENTS

| EP | 1089516 A2 * | 4/2001 |
| JP | 06268741 | 9/1994 |
| WO | WO 99/12364 * | 3/1999 |
| WO | WO 02/082792 A1 | 10/2002 |

OTHER PUBLICATIONS

Mclaughlin, "The Electronic Journal for Sun Users Since 1988", Jun. 1994, SunFlash vol. 66 #22.*

* cited by examiner

*Primary Examiner*—Jalatee Worjloh
(74) *Attorney, Agent, or Firm*—Hollingsworth & Funk, LLC

(57) ABSTRACT

The invention relates to a method and an arrangement for concealing the true identity of a user in a communications system comprising a first user equipment having a first characteristic identifier, a second user equipment having a second characteristic identifier, a service network serving the first and the second user equipment. The method according to the invention comprises: requesting a virtual identifier by means of the first user equipment; establishing the virtual identifier for the first user equipment; linking the virtual identifier of the first user equipment to the first characteristic identifier of the first user equipment and using the virtual identifier of the first user equipment for communication between the first and the second user equipment.

39 Claims, 2 Drawing Sheets

…

Figure 1:
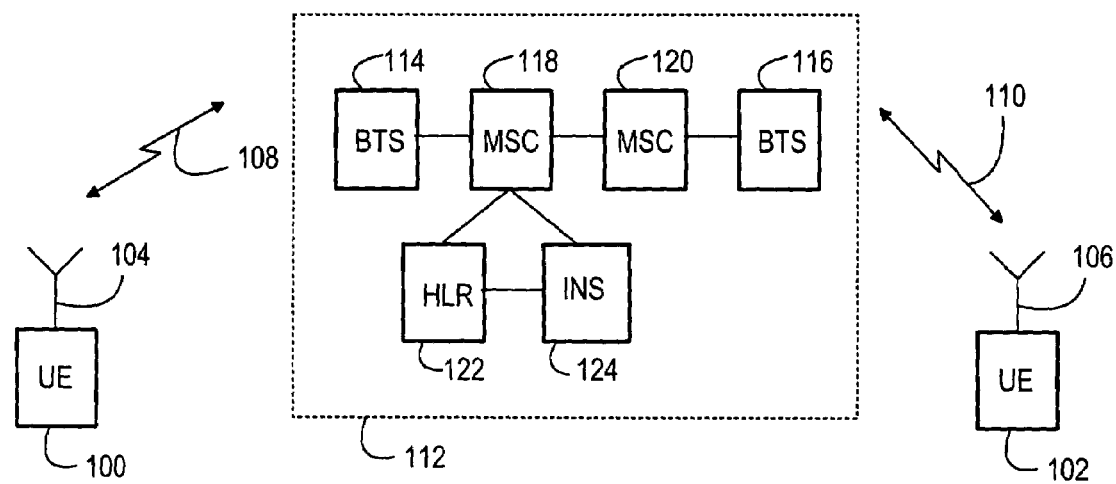

METHOD AND ARRANGEMENT FOR CONCEALING TRUE IDENTITY OF USER IN COMMUNICATIONS SYSTEM

FIELD

The invention relates to a method and an arrangement for concealing the true identity of a user in a communications system.

BACKGROUND

In present communications systems, each user is given a unique identifier, by means of which the true identity of the user is identified. The characteristic identifier is linked, for example, to a phone number of the user. The phone number is, in turn, associated with subscription profiles maintained by telecommunications service providers, such as mobile network operator. In communications networks phone numbers are used to identify the users, for example, for the purposes of charging and routing calls or delivering messages. The phone numbers are also used for other services, such as calling line indication, identification of a message sender and caller specific ringing tones. Also e-mail and IP (Internet protocol) addresses used in communications systems contain information useful for tracing the identity of the users of the system. An IP address contains numerical identification for individualising a data processor or a data transferring device connected to the Internet.

When a user of a mobile phone is for example calling another user of the communications system, the phone number of the caller is delivered to the called party, who may store the information of the phone number and use it for purposes unwanted by the caller. In some cases it is possible for the caller to prevent the delivery of the phone number for example, which in turn inhibits further communication between the parties. The called party cannot for example call back to the primary caller if the phone number is not delivered by the network or given by the caller.

Also in known electronic mail systems, when a user transmits an e-mail message, a return address is generated to be used by a recipient when sending a response. The return address is typically based on the user's account name. Consequently, the user's e-mail address cannot be changed without changing the user's account name. Additionally the account name and the corresponding e-mail address can reveal the user's identity to a certain extent. The e-mail addresses can be transferred from one person to another, even if the holder himself does not teach the e-mail address. E-mail and IP addresses are easily discovered and the true identities behind the addresses can be traced with little difficulty. Revealing e-mail or IP addresses to unwanted parties may cause considerable inconvenience in form of harassment e-mails and abuse of addresses.

In present communications systems, it is becoming increasingly important to protect the users true identities from being revealed to unwanted parties. It is also necessary for the communications system to be able to confidently and uniquely recognise the identity of the users in order to enable mutual communication between the relevant parties.

BRIEF DESCRIPTION OF THE INVENTION

It is an object of the invention to provide a method and an arrangement so as to alleviate prior art problems. This is achieved with a method for concealing the true identity of a user in a communications system comprising a first user equipment having a first characteristic identifier, a second user equipment having a second characteristic identifier, a service network serving the first and the second user equipment. The method of the invention comprises: requesting a virtual identifier by means of the first user equipment; establishing the virtual identifier for the first user equipment; linking the virtual identifier of the first user equipment to the first characteristic identifier of the first user equipment; using the virtual identifier of the first user equipment for communication between the first and the second user equipment.

The invention also relates to an arrangement for concealing the true identity of a user in a communications system comprising: a first user equipment having a first characteristic identifier, a second user equipment having a second characteristic identifier, a service network connecting the first and the second user equipment. The arrangement of the invention is configured to: request a virtual identifier by means of the first user equipment; establish the virtual identifier for the first user equipment; link the virtual identifier of the first user equipment to the first characteristic identifier of the first user equipment; use the virtual identifier of the first user equipment for communication between the first and the second user equipment.

Preferred embodiments of the invention are described in the dependent claims.

The method and arrangement of the invention provide several advantages. More privacy and system-enforced control over personal identifiers is made possible. The true identities of the users are protected from disturbing and unauthorized usage, while a mutual communication between the users is enabled at the same time.

LIST OF THE DRAWINGS

Figure 2:
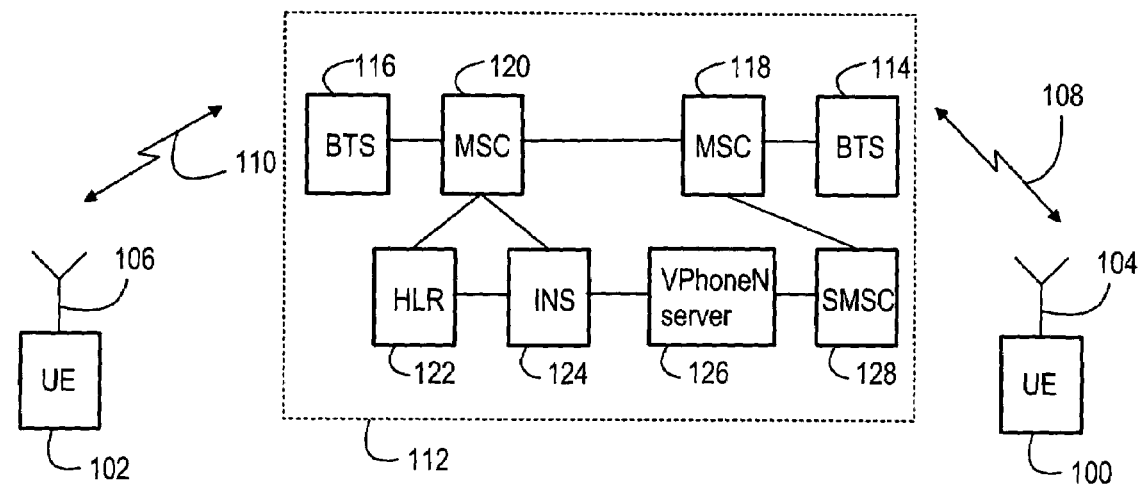
Figure 3:
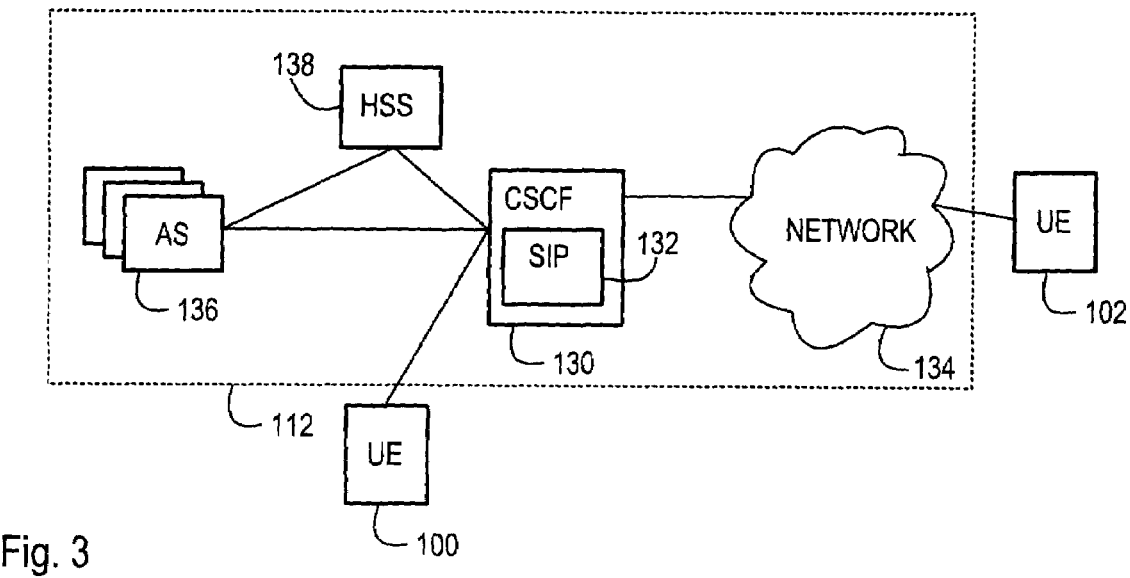
Figure 4:
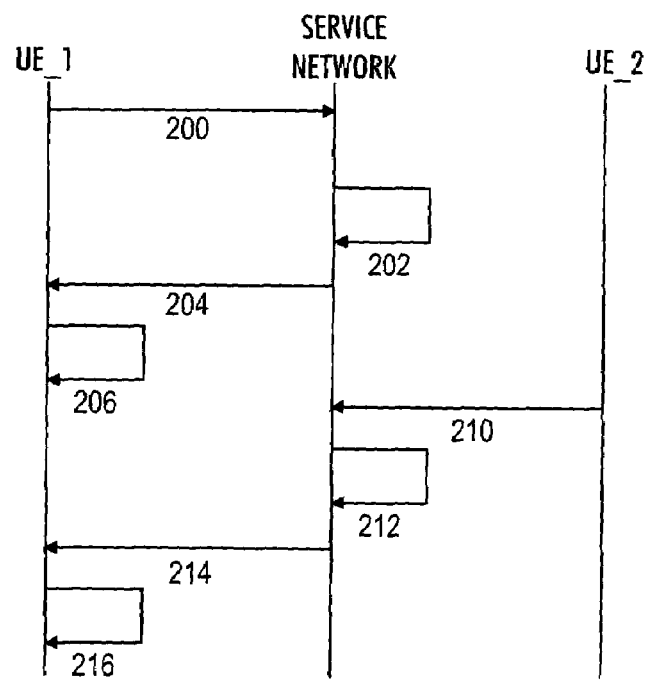

In the following, the invention will be described in greater detail with reference to the preferred embodiments and the accompanying drawings, in which FIG. 1 illustrates an example of a communications system in accordance with the present invention, FIG. 2 illustrates another example of a communications system in accordance with the present invention, FIG. 3 illustrates an example of a communications system in accordance with the present invention and FIG. 4 illustrates a method according to exemplary embodiments of the present invention.

DESCRIPTION OF THE EMBODIMENTS

With reference to FIG. 1, let us examine an example of a communications system, to which the preferred embodiments of the invention can be applied. FIG. 1 is a simplified block diagram showing only those parts of a communications system necessary for understanding the present invention. The structure and functions of the network elements are not described in de-tail, as they are generally known. The communications system is, for example, a 2.5-generation GSM (Global System for Mobile communications)/GPRS (General Packet Radio Service) radio system, a second generation GSM radio system or a third generation UMTS (Universal Mobile Telecommunications System) radio system using WCDMA (wide band code division multiple access) technique or various combinations thereof.

In general, the communications system can be defined to comprise user equipment, also known as a subscriber terminal, and a mobile phone, for instance, and a network part, which comprises the fixed infrastructure of the communications system, i.e. the core network, the radio access network and the base station system. Intelligent communications systems are also well known. Such systems are used to provide a variety of different services to the users within the communications system. The network elements illustrated in FIG. 1 may be carried out by one or more physical network devices, such as one or more computing systems, etc. The physical devices used to implement the functions of the system may be integrated or segregated. Connections in the communications system can be set up across the broadband packet net-work using any known session control protocol, such as, Session Initiation Protocol (SIP), also enabling connections to be set up across the Public Switched Telephone Network (PSTN) (not shown).

For example in existing mobile communications networks a base station (BTS), a home location register (HLR) and a mobile switching centre (MSC) are used for processing a call. In an intelligent network, an IN system (INS, intelligent network system) is used for performing the service. The IN system architecture brings all switching and transmission functions under the control of a distributed computer system so that a highly sophisticated services can be provided right across the network, instead of being applied only to specific parts. The IN system enables the integration of the fixed and mobile network services, for instance.

In FIG. 1, the communications system comprises a first user equipment 100 and a second user equipment 102 having a duplex connection 108, 110 with a service network 112. The service network 112 comprises a first base station 114, a first mobile switching centre (MSC) 118, a home location register (HLR) 122, an intelligent network system (INS) 124, a second mobile switching centre (MSC) 120 and a second base station (BTS) 116.

The base station 114, 116 provides the transceiver functions of the base station system. Each base station 114, 116 comprises one or more transceivers. The operations of the base station 114, 116 include: calculation of timing advance (TA), uplink measurements, channel coding, encryption, decryption, and frequency hopping.

The mobile services switching centre 118, 120 is the centre point of the circuit-switched side of the service network 100. The same mobile services switching centre 118, 120 can be used to serve the connections of the radio access network (not shown) and the base stations 114, 116. The operations of the mobile services switching centre 118, 120 include: switching, paging, user equipment location registration, handover management, collection of sub-scriber billing information, encryption parameter management, frequency allocation management, and echo cancellation. The number of mobile services switching centres 118, 120 may vary: a small network operator may only include one mobile services switching centre 118, 120, whereas large service networks 112, may include several.

A home location register (HLR) 122 comprises a permanent subscriber register, i.e. the following information, for instance: an international mobile subscriber identity (IMSI), a mobile subscriber ISDN number (MSISDN), an authentication key, and when the radio system supports GPRS, a packet data protocol (PDP) address.

The characteristics of the IN system 124 can be modified by changing the type or number of the IN system 124 elements. The IN system 124 comprises elements such as service control point (SCP), service management point (SMP), service creation environment (SCE) and service management interface (SMI). The service control point has access to data and logic for con-trolling the processing of calls in order to provide given services. The service management point implements service management functions and service, and sub-scription information is stored and managed therein. The service management interface is an application programming interface (API) for the IN system subscriber database in the service management point (SMP).

The user equipment 100, 102 comprises at least one transceiver for establishing a radio link to the base station 114. The user equipment 100, 102 may comprise at least two different subscriber identity modules. In addition, the user equipment 100, 102 comprises an antenna 104, 106, a user interface and a battery. Presently, there are different types of user equipment 100, 102, for instance, equipment installed in cars and portable equipment. Properties better known from personal or portable computers have also been implemented in the user equipment 100, 102.

The first user equipment 100 has a first characteristic identifier and the second user equipment 102 has a second characteristic identifier by means of which the service network 112 is able to identify the user equipments and provide them with the services relevant to the respective characteristic identifiers. The true identities of the users are easily discovered when their characteristic identifiers, such as phone numbers, are known. The object of the arrangement illustrated in FIG. 1 is to conceal the true identity of a user in the communications system when a communications connection between different user equipments is established, for example.

In an embodiment according to the invention, the first user equipment requests for a virtual identifier or several virtual identifiers from the service network 112, for example a mobile operator or the like. After receiving the request for a virtual identifier, the virtual identifier is established in the service network 112. The virtual identifier is established in the IN system 124, which comprises a database of virtual identifiers, for example. In the IN system 124 the virtual identifier of the first user equipment 100 is then linked to the first characteristic identifier of the first user equipment 100. The virtual identifier of the first user equipment 100 is then used, when concealing the true identity of the user of the first user equipment 100 is required, for example when establishing a connection between the first and the second user equipment 100, 102.

When the first user equipment 100 requests for a communications connection to be established to the second user equipment 102 from the service network 112, the second user equipment 102 is searched for from the home location register 122 and the communications connection is formed to the second user equipment 102 through the second mobile switching centre 120 and the second base station 116. However, instead of using the first characteristic identifier of the first user equipment 100, the virtual identifier linked to the first characteristic identifier of the first user equipment 100 is used when establishing the connection. Thus, the second user equipment 102 receives information only about the virtual identifier instead of the first characteristic identifier of the first user equipment 100.

It is possible to predetermine different limitations for the use of virtual identifiers. A given validity period during which the virtual identifier is valid can be predetermined, for example. All the user equipment in the communications system having the right to use the virtual identifier can also be predetermined. Limiting the use of the virtual identifier to take place only at certain hours of the day is also possible. In addition, it may be predetermined that the virtual identifiers are available in national communications only, for example.

The IN system 124 includes a database comprising a list of virtual identifiers, such as phone numbers of given format. The first numbers of the virtual phone number may for example always be the same particular numbers for all the virtual identifiers, for instance. When receiving such a known format of the virtual identifier, the user of the second user equipment 102 knows that the call was made using virtual identifiers. The second user equipment 102 cannot solve the first characteristic identifier, such as the true phone number, of the first user equipment 100. It is possible, however, for the second user equipment 102 to return the call of the first user equipment 100 by using the virtual identifier received from the first user equipment 100 depending on whether the virtual identifier is still valid, for example.

If the second user equipment 102 requests from the service network 112 for a communications connection to be established to the first user equipment 100 by using the virtual identifier of the first user equipment 100, the virtual identifier is matched to databases in the IN system 124. The databases include information about the characteristic identifiers linked to the virtual identifiers, and after finding the correct characteristic identifier the connection is established to the first user equipment 100. The first user equipment 100 is configured to receive information about the use of the virtual identifier linked to the first characteristic identifier. There are means in the first user equipment 100 for receiving and utilizing the information about the use of the virtual identifier linked to the first characteristic identifier, which information is received from the service network 112. When a communications connection is being established to the first user equipment 100 and the caller has used the virtual identifier of the first user equipment 100, when requesting the connection to be established, the information about the use of the virtual identifier is shown on the display of the first user equipment 100, for example.

In FIG. 2 another example of the communications system in accordance with the present invention is shown. In addition to the elements shown in FIG. 1, the communications system of FIG. 2 comprises: a virtual phone number server 126 and a short message service centre (SMSC) 128. The short message service centre 128 is located in the service network 112, or alternatively outside the network, but it has signalling connections to the mobile services switching centre 120. The short message service centre 128 is a network element, through which short messages are transmitted and in which they can be stored for later transmission if the receiver is not reached. The virtual phone number server 126 is a part of the service network 112 and is connected to both the short message service centre 128 and to the IN system 124. Alternatively the virtual phone number server 126 is a part of the IN system 124 or the short message service centre 128. The virtual phone number server 126 manages the establishment of the virtual identifiers and the linking of the virtual identifiers to the characteristic identifiers, for example. The virtual phone number server 126 may comprise a database of all the available virtual identifiers, for instance. It is possible that the first user equipment 100 requests for virtual identifiers by sending a SMS (short message service) message. Then the virtual phone number server 126 is used for establishing the virtual identifiers and linking them to the first characteristic identifier of the first user equipment 100, for example. The virtual identifiers requested by the first user equipment 100 can then be sent through the short message service centre 128 to the first user equipment 100, for example.

In the embodiment shown in FIG. 2, the home location register 122 comprises a database of characteristic identifiers, such as phone numbers. There is a database comprising a set of virtual identifiers, such as virtual phone numbers, as well. The virtual phone number databases are placed in the IN system 124 and in the virtual phone number server 126 as well, for example. The database of virtual identifiers contains information about the availability of the virtual identifiers, about the characteristic identifiers, to which the virtual identifiers are linked and about the limitations of using the virtual identifiers, for example.

Let us now consider a situation where the first user equipment 100 has already one or more virtual identifiers ready for use. The user of the second user equipment 102 wishes to call the first user equipment 100. The user of the first user equipment 100 has previously provided the user of the second user equipment 102 with the virtual identifier of the first user equipment 100. The second user equipment 102 may have received the virtual identifier of the first user equipment 100 via a short message service, for example, or perhaps through a short-range connection, such as a Bluetooth connection, between the user equipment 100, 102.

At first the second user equipment 102 transmits the request for establishing a communications connection between the first and the second user equipments 100, 102 to the service network 112. The request comprises the virtual identifier of the first user equipment 102. After receiving the request for establishing the communications connection from the second user equipment 102 containing the virtual identifier of the first user equipment 100, the second mobile services switching centre 120 sends the virtual identifier to the home location register 122. The home location register 122 comprises a piece of information about a given characteristic identifier being linked to the virtual identifier received. The home location register 122 then sends an enquiry to the IN system 124 about the characteristic identifier linked to the virtual identifier. In the IN system 124, the virtual identifier received from the home location register 122 and the corresponding characteristic identifier are found from the database of virtual identifiers. The information about the characteristic identifier linked to the received virtual identifier is then returned to the home location register 122 and the communications connection to the first user equipment 100 is established.

FIG. 3 illustrates a communications system, which can be implemented in accordance with a preferred embodiment of the present invention. The service network according to the present invention in FIG. 3 comprises the first user equipment 100, the second user equipment 102, a computer net-work 134, a CSCF (call server control function) 130, a SIP (session initiation protocol) server 132, a HSS (home subscriber server) 138 and one or more application servers (AS) 136.

The computer network 134 generally represents the Internet, which includes a large network of servers that are accessible by the user equipment 100, 102, such as personal computers, through a private Internet access provider or an on-line service provider. Those skilled in the art may appreciate the fact that computer network 134 may also be implemented in association with wireless networks accessed by means of wireless remote devices, such as, WAP (Wireless Application Protocol) communication devices.

The CSCF (call server control function) 130 is the main call control element in an IP multimedia core network subsystem. It is a part of the call processing server (CPS), for example. The CSCF 130 consists of two components: a serving CSCF (S-CSCF) and an interrogating CSCF (I-CSCF). The S-CSCF provides the call control function (CCF), the serving profile database (SPD), and the address handling (AH) functions. The S-CSCF requests for the calling party's profile from the serving profile database (SPD) and routes the call to the interrogating CSCF, the media gateway control function (MGCF), or to the service node, if service interaction is required. The I-CSCF interrogates the home subscriber server (HSS) for information that enables the call to be directed to the serving CSCF. The I-CSCF provides incoming call gateway (ICGW) and ad-dress handling (AH) functions.

Internet communications are for example session-based rather than connection-based. Generally, an Internet protocol, such as Session Initiation Protocol (SIP) is used to establish the session and to negotiate the features for the session. When the service network receives a request to initiate an IP session or a call to a called party address or number, the IP proxy server deter-mines whether it needs intelligent network services in order to route the request to the called party address or number. The SIP (session initiation protocol) server 132 comprises an application-layer control protocol for creating, modifying, and terminating sessions with one or more user equipment 100, 102.

The HSS (home subscriber server) 138 is a master database for a given user, which is used for keeping a list of features and services associated with a user, and for tracking the location of and means of access for its users The HSS 138 provides the functions of the home location register (HLR). The HSS differs from the HLR in that it also communicates via IP-based interfaces. In addition, the HSS 138 provides the functions of the user mobility server (UMS).

The IN system functionality is provided by means of the application servers (AS) 136, which may be provided as one or more elements, such as Service Control Points (SCP). Alternatively, the application servers 136 may be provided as a server deployed in a broadband packet network. In the embodiment illustrated in FIG. 3, three application servers 136 are provided for carrying out the IN system functionality. For an easier description of the present invention, a simplified communications system is presented. However, the pre-sent invention is not limited to this simplified embodiment.

In particular, the user's characteristic identifier may include information about one or more of the user's e-mail addresses, the user's URL (Universal Resource Location) identifier, a Gopher address, a Wide Area information Server (WAIS) address and a file transport protocol (FTP) address. Each user is assigned, for example, a unique e-mail address, as is well known in the art. The e-mail addresses comprise domain names, which are utilized by DNS (Domain Name Servers) servers on the Internet so as to obtain a numerical TCP/IP address. The DNS server resolves the IP address or IP addresses of the corresponding Internet address.

In a method according to an exemplary embodiment in FIG. 3, the first user equipment 100 requests for the virtual identifier from the service net-work 112. The virtual identifiers are established in the application servers 136, for example. Also the linking of the virtual identifiers to the characteristic identifiers is managed in the application servers 136, for instance. Alternatively, it is possible that the virtual identifiers are established and linked to the characteristic identifiers of the first user equipment 100 in the first user equipment 100. The first user equipment 100 comprises means corresponding to the routers in the service network 112, for example. It is then possible that the first user equipment 100 is not directly seen as being a user equipment to the service network 112. It may therefore be possible that not even the service network 112 knows about the characteristic identifiers linked to the virtual identifiers used for communications in the service network 112.

When the first user equipment 100 wishes to send an electronic mail message to the second user equipment 102, for example, the first user equipment 100 attaches the virtual identifier, which is linked to the characteristic identifier of the first user equipment 100, when sending the electronic mail message. The electronic mail message containing the virtual identifier of the first user equipment 100 is delivered through the service network to the second user equipment 102. The second user equipment 102 receives the electronic mail message and can reply to the electronic mail message by using the virtual identifier attached to it.

A method according to an exemplary embodiment of the invention is shown in FIG. 4. The first vertical line labelled UE_1 illustrates the functions conducted by the first user equipment: The second vertical line labelled SERVICE NETWORK illustrates the functions conducted by the service network, the service network comprising the essential parts enabling the relevant activities of the service network. The third vertical line labelled UE_2 illustrates the functions conducted by the second user equipment. The arrow lines represent the different phases of the method.

Let us take a look at the method shown in FIG. 4 from the viewpoint of the holder of the first user equipment UE_1. The holder of the first user equipment UE_1 wishes to sell his car, for example. In order to make his intensions of selling the car known, the holder of the first user equipment places a sales advertisement in a newspaper or on the Internet, for example. However, the holder of the first user equipment UE_1 does not want to reveal his true identity to the public. Therefore, he cannot place his characteristic identifier, such as his real phone number or his real e-mail address, in the sales advertisement. Instead, the holder of the first user equipment UE_1 requests for a virtual identifier from the service network in phase 200 of FIG. 4 in order to conceal his true identity with the virtual identifier. Alternatively, the holder of the first user equipment UE_1 has already a set of virtual identifiers to choose from in the first user equipment UE_1, and then a given virtual identifier is activated in phase 200.

In phase 202 the virtual identifier is established for the first user equipment UE_1 in the SERVICE NETWORK. The SERVICE NETWORK also links the virtual identifier to the first characteristic identifier of the first user equipment UE_1. The first user equipment UE_1 receives in phase 204 the virtual identifier, such as a virtual phone number or a virtual e-mail address. In phase 206, the received virtual identifier is stored in the first user equipment UE_1. The holder of the first user equipment UE_1 then places the sales advertisement including the virtual identifier in a newspaper or on the Internet, for example. The sales advertisement including the virtual identifier is sent to a given Internet site through the SERVICE NETWORK, for example. Thus, the possible buyers are not able to know the true identity of the seller by reading the sales advertisement. The holder of the first user equipment UE_1 may also be provided with certain predetermined limitations about the use of the virtual identifier. Such limitations include for example a given validity period during which the virtual identifier is valid. If the given validity period is for example two weeks, then it will not be possible for anyone to use the virtual identifier after the two weeks.

When a possible buyer notices the sales advertisement with the virtual identifier, the buyer then contacts the seller by using the virtual identifier. In phase 210, the second user equipment UE_2 transmits to the SERVICE NETWORK a request for establishing a connection, the request comprising the virtual identifier of the first user equipment UE_1. In phase 212, in the SERVICE NETWORK, the characteristic identifier to which the virtual identifier received from the second user equipment UE_2 is linked to, is found. At this point the virtual identifier is linked to the first characteristic identifier of the first user equipment UE_1. The SERVICE NETWORK then establishes the connection between the second and the first user equipment in phase 214. The SERVICE NETWORK uses the first characteristic identifier of the first user equipment UE_1 for establishing the connection between the second and the first user equipment. Also the information about the use of the virtual identifier of the first user equipment UE_1 is transmitted to the first user equipment UE_1. The holder of the first user equipment UE_1 may have a specific name, such as "car business", predetermined to the address book of the first user equipment UE_1 for the virtual identifier, which is used in the sales advertisement. As the second user equipment UE_2 has then used the virtual identifier of the first user equipment UE_1, the information about the use of the virtual identifier is received in the first user equipment UE_1. In phase 216, the first user equipment UE_1 announces on the display of the first user equipment UE_1, for example, that the incoming call is being set up by means of the virtual identifier linked to the first characteristic identifier of the first user equipment UE_1. The holder of the first user equipment UE_1 observes a notification on the display of the first user equipment UE_1 stating for instance "car business". Thereby the holder of the first user equipment UE_1 instantly knows the reasons for the incoming connection and may react accordingly.

Even though the invention is described above with reference to an example according to the accompanying drawings, it is clear that the invention is not restricted thereto but it can be modified in several ways within the scope of the appended claims.

The invention claimed is:

1. A method comprising:
   requesting a virtual identifier from a first user equipment;
   establishing a virtual identifier for the first user equipment in at least one of: the first user equipment and the service network;
   linking the virtual identifier of the first user equipment to a characteristic identifier of the first user equipment;
   requesting from a service network, by a second user equipment, a communications connection to be established to the first user equipment by using the virtual identifier of the first user equipment;
   matching the virtual identifier used in the request from the second user equipment to a database of virtual identifiers linked to characteristic identifiers in the service network; and
   establishing, by the service network, the requested communications connection from the second user equipment to the first user equipment when the characteristic identifier matching the virtual identifier of the first user equipment has been found on the basis of the matching.

2. The method of claim 1, the method further comprising requesting the virtual identifier from a service network of the communications system.

3. The method of claim 1, the method further comprising requesting multiple virtual identifiers from a service network of the communications system.

4. The method of claim 1, the method further comprising providing a set of virtual identifiers in a service network of the communications system, one or more of the virtual identifiers being linked to the characteristic identifier of the first user equipment.

5. The method of claim 1, the method further comprising selecting, in a service network of the communications system, the virtual identifier to be used for communication between the first and the second user equipment.

6. The method of claim 1, the method further comprising receiving at a service network of the communications system a request for establishing a communications connection between the first and the second user equipment, the request comprising the virtual identifier of the first user equipment.

7. The method of claim 6, the method further comprising receiving the request for establishing the communications connection between the first and the second user equipment via a short message service.

8. The method of claim 6, the method further comprising receiving the request for establishing the communications connection between the first and the second user equipment via an electronic mail server service.

9. The method of claim 6, the method further comprising receiving the request for establishing the communications connection between the first and the second user equipment from the second user equipment.

10. The method of claim 9, the method further comprising receiving, in the first user equipment, information about the use of the virtual identifier of the first user equipment.

11. The method of claim 1, the method further comprising predetermining a given validity period of the virtual identifier.

12. The method of claim 1, the method further comprising predetermining one or more user equipment that have the right to use the virtual identifier.

13. The method of claim 1, the method further comprising predetermining one or more limitations for the use of the virtual identifier by predetermining a given validity period during which the virtual identifier is valid.

14. The method of claim 1, the method further comprising predetermining one or more limitations for the use of the virtual identifier by predetermining one or more user equipments permitted to use the virtual identifier.

15. The method of claim 1, the method further comprising predetermining one or more limitations for the use of the virtual identifier by predetermining certain time periods in which the virtual identifier may be used.

16. The method of claim 1, the method further comprising predetermining one or more limitations for the use of the virtual identifier by predetermining that a virtual identifier may only be used in national communication.

17. A system comprising:
   a first user equipment configured to request a virtual identifier;
   a second user equipment; and
   a service network configured to receive the request and to establish a virtual identifier for the first user equipment, link the virtual identifier of the first user equipment to a characteristic identifier of the first user equipment,
   the second user equipment being configured to request from the service network a communications connection to be established to the first user equipment by using the virtual identifier of the first user equipment, and
   the service network being further configured to match the virtual identifier used in the request from the second user equipment to a database of virtual identifiers linked to characteristic identifiers in the service network, and to establish the requested communications connection from the second user equipment to the first user equipment when the characteristic identifier matching the virtual identifier of the first user equipment has been found on the basis of the matching.

18. The system of claim 17, wherein the first user equipment is configured to request the virtual identifier from the service network of the communications system.

19. The system of claim 17, wherein the service network is configured to establish multiple virtual identifiers.

20. The system of claim 17, wherein the service network of the communications system comprises a set of virtual identifiers and is configured to link one or more of the virtual identifiers of the set to the first characteristic identifier of the first user equipment.

21. The system of claim 17, wherein the second user equipment is configured to transmit to the service network of the communications system a request for establishing a communications connection between the first and the second user equipment, the request comprising the virtual identifier of the first user equipment.

22. An apparatus configured to:
request a virtual identifier;
establish a virtual identifier;
link the virtual identifier of the apparatus to a characteristic identifier of the apparatus in order to configure a second apparatus to request from the service network a communications connection to be established to the apparatus by using the virtual identifier of the apparatus, and in order to configure the service network to establish the requested communications connection from the second apparatus to the apparatus on the basis of determining that the characteristic identifier matches the virtual identifier of the apparatus.

23. The apparatus of claim 22, wherein the apparatus is configured to establish multiple virtual identifiers.

24. The apparatus of claim 22, wherein the apparatus is configured to receive information about the use of the virtual identifier linked to the characteristic identifier of the apparatus from a service network of the communications system when a connection is established between the apparatus and the second apparatus.

25. The apparatus of claim 22, wherein the apparatus is configured to predetermine one or more limitations for the use of the virtual identifier by predetermining a given validity period during which the virtual identifier is valid.

26. The apparatus of claim 22, wherein the apparatus is configured to predetermine one or more limitations for the use of the virtual identifier by predetermining one or more apparatuses permitted to use the virtual identifier.

27. The apparatus of claim 22, wherein the apparatus is configured to predetermine one or more limitations for the use of the virtual identifier by predetermining certain time periods in which the virtual identifier may be used.

28. The apparatus of claim 22, wherein the apparatus is configured to predetermine one or more limitations for the use of the virtual identifier by predetermining that a virtual identifier may only be used in national communication.

29. A method comprising:
establishing a connection between a first user equipment and a second user equipment when a virtual identifier established for the first user equipment in at least one of: the first user equipment and the service network, consisting at least in part of numbers where at least a portion of the numbers identify the virtual identifier as a virtual identifier, linked to a first characteristic identifier of the first user equipment, and having predetermined one or more limitations for the use of the virtual identifier, the virtual identifier of the first user equipment is used by the second user equipment in a request to the service network for establishing a communications connection to the first user equipment, and the service network matches the virtual identifier used in the request from the second user equipment to a database of virtual identifiers linked to characteristic identifiers in the service network, and establishes the requested communications connection from the second user equipment to the first user equipment when the characteristic identifier matching the virtual identifier of the first user equipment has been found on the basis of the matching.

30. The method of claim 29, wherein having predetermined one or more limitations for the use of the virtual identifier includes having predetermined a given validity period during which the virtual identifier is valid.

31. The method of claim 29, wherein having predetermined one or more limitations for the use of the virtual identifier includes having predetermined one or more user equipments permitted to use the virtual identifier.

32. The method of claim 29, wherein having predetermined one or more limitations for the use of the virtual identifier includes having predetermined certain time periods in which the virtual identifier may be used.

33. The method of claim 29, wherein having predetermined one or more limitations for the use of the virtual identifier includes having predetermined that a virtual identifier may only be used in national communication.

34. An apparatus, comprising a processor configured to:
link a virtual identifier established for a first user equipment to a characteristic identifier of the first user equipment in order to configure the use of the virtual identifier of the first user equipment for communication between the first and a second user equipment wherein the virtual identifier consists at least partly of numbers where at least a portion of the numbers identify the virtual identifier as a virtual identifier;
predetermine one or more limitations for the use of the virtual identifier;
receive a request comprising the virtual identifier of the first user equipment from the second user equipment for establishing a communication connection between the first and second user equipments, wherein communication between the first and second user equipments takes into account the one or more predetermined limitations;
match the virtual identifier used in the request from the second user equipment to a database of virtual identifiers linked to characteristic identifiers; and
establish the requested communications connection from the second user equipment to the first user equipment when the characteristic identifier matching the virtual identifier of the first user equipment has been found on the basis of the matching.

35. The apparatus of claim 34, wherein the apparatus is further configured to send the virtual identifier to the first user equipment via a short message service.

36. The apparatus of claim 34, wherein the processor configured to predetermine one or more limitations for the use of the virtual identifier includes being configured to predetermine a given validity period during which the virtual identifier is valid.

37. The apparatus of claim 34, wherein the processor configured to predetermine one or more limitations for the use of the virtual identifier includes being configured to predetermine one or more user equipments permitted to use the virtual identifier.

38. The apparatus of claim 34, wherein the processor configured to predetermine one or more limitations for the use of the virtual identifier includes being configured to predetermine certain time periods in which the virtual identifier may be used.

39. The apparatus of claim 34, wherein the processor configured to predetermine one or more limitations for the use of the virtual identifier includes being configured to predetermine that a virtual identifier may only be used in national communication.

* * * * *

UNITED STATES PATENT AND TRADEMARK OFFICE
CERTIFICATE OF CORRECTION

PATENT NO. : 7,627,533 B2 Page 1 of 1
APPLICATION NO. : 10/681393
DATED : December 1, 2009
INVENTOR(S) : Marko H. Kokko It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 364 days.

Signed and Sealed this

Second Day of November, 2010

David J. Kappos
*Director of the United States Patent and Trademark Office*